United States Patent [19]
Borg

[11] Patent Number: 5,768,689
[45] Date of Patent: Jun. 16, 1998

[54] TRANSCEIVER TESTER

[75] Inventor: Gunnar Borg, Dallas, Tex.

[73] Assignee: Telefonaktiebolaget LM Ericsson, Stockholm, Sweden

[21] Appl. No.: 414,645

[22] Filed: Apr. 3, 1995

[51] Int. Cl.$^6$ ................................................. H04B 17/00
[52] U.S. Cl. ................................................. 455/67.4; 455/561
[58] Field of Search ........................... 455/33.1, 54.1, 455/63, 67.1, 67.3, 67.4, 88, 9, 561, 434, 515, 67.7; 379/4, 5, 21

[56] References Cited

U.S. PATENT DOCUMENTS

| | | | |
|---|---|---|---|
| 4,140,573 | 2/1979 | Stevens | 455/67.4 |
| 4,977,399 | 12/1990 | Price et al. | 455/67.4 |
| 5,119,397 | 6/1992 | Dahlin et al. | |
| 5,212,689 | 5/1993 | Eriksson | |
| 5,289,526 | 2/1994 | Chymyck et al. | 455/67.1 |
| 5,398,276 | 3/1995 | Lemke et al. | 455/67.3 |
| 5,408,696 | 4/1995 | Hofverberg | |
| 5,410,753 | 4/1995 | Szabo | 455/88 |
| 5,521,904 | 5/1996 | Eriksson et al. | 455/67.4 |

FOREIGN PATENT DOCUMENTS

| | | |
|---|---|---|
| 0 431 956 | 6/1991 | European Pat. Off. |
| 2-29038 | 1/1990 | Japan ............ 455/67.4 |
| 2 255 881 | 11/1992 | United Kingdom . |
| WO91/15904 | 10/1991 | WIPO . |
| WO91/19363 | 12/1991 | WIPO . |
| WO91/19364 | 12/1991 | WIPO . |
| WO91/19365 | 12/1991 | WIPO . |
| WO91/19366 | 12/1991 | WIPO . |
| WO94/00932 | 1/1994 | WIPO . |
| WO95/08246 | 3/1995 | WIPO . |

OTHER PUBLICATIONS

36th IEEE Vehicula Technology Conference, W.P. Chapman et al., "Cellular Performance Evaluation Tools and Techniques", pp. 279–284, May 20–22, 1986.

Abstract of German Patent Application 42 15 422, Nov. 1992.

CME 20 System Training Document, Ericsson Radio Systems AB, EN/LZT 120 266/13 R3A, pp. 3(14)–12(14); EN/LZT 120 266/17 R3A, pp. 1(25 –25(25, (Oct. 31, 1992).

Primary Examiner—Nguyen Vo
Attorney, Agent, or Firm—Burns, Doane, Swecker & Mathis, L.L.P.

[57] ABSTRACT

A test loop is provided in a cellular network for testing and supervising a complete chain of radio equipment needed to carry cellular traffic from a radio base station. A software modified mobile station including a transceiver test unit is cable connected between transmitter and receiver parts in a radio base station. Logic is introduced in the base station controller to establish connections to the mobile station on all traffic channels in the cell and evaluate measurement reports from the transceiver test unit and receiver. If signal strength and/or bit error rate are not within a predefined expected interval, an alarm is given in the base station controller. Also, reports can be provided on the measured signal strength and bit error rate on all traffic channels in the cell. The transceiver test can be initiated by periodic command. In addition, statistics on traffic in the cell can be evaluated to determine abnormal behavior in the cell which results in automatic initiation of a transceiver test. Continuous supervision is provided in the cell to accomplish fast fault detection and fault localization, thus lowering costs, minimizing cellular traffic down time and increasing quality of service for the end user.

6 Claims, 2 Drawing Sheets

TRANSCEIVER TESTER

BACKGROUND

This invention relates to a system for testing equipment in a cellular network and more particularly to a system for detecting and locating faults on transmission and receiver links in a radio base station.

A cellular radiotelephone system typically comprises a network of neighboring radio cells that together provide complete coverage of a geographic area to be serviced. Each cell has a base station (BS) that communicates with one or more mobile stations (MSs) through associated radio channels. A set of radio channels assigned to a given cell is different from the sets used in neighboring cells in order to avoid interference. Groups of BSs are controlled by respective mobile services switching centers (MSCs), each of which is equivalent to a local exchange in the public switched telephone network (PSTN). Thus, an MSC is responsible for handling tasks such as switching, routing, and charging calls and communications to and from the PSTN and other networks.

Well known cellular systems are the Nordic Mobile Telephone (NMT) system; Total Access Communication System (TACS); Advanced Mobile Phone System (AMPS); American Digital Cellular (ADC) system; Global System for Mobile Communication (GSM); and Personal Digital Cellular (PDC) system (formerly called the Japanese Digital Cellular (JDC) system). Various aspects of the GSM system are described in U.S. Pat. No. 5,408,696 to Hofverberg for "Method and Apparatus for Correcting a Radio Signal Strength Information Signal"; and U.S. Pat. No. 5,212,689 to Eriksson for "Method of Transmitting Different Commands Relating to the Choice of Transmitter Antenna in a Time Multiplex Radio Communications System". Both of these patents are incorporated here by reference.

Many of the specific details of hardware implementations of radio communication systems are beyond the scope of the present discussion, but those skilled in the art will readily appreciate that this invention can be applied to any such system. One example of a radio communication system is a cellular communication network in which an MSC is connected between a PSTN and one or more BSs that transmit and receive signals from the MSs. When a call is connected, communication takes place over a traffic channel. The specification of such traffic channels, and of control channels used in setting up communications on traffic channels, can be according to the applicable standard for the system being implemented, e.g., GSM, PDC, ADC, etc. For those interested in an exemplary hardware configuration of such base and mobile stations, U.S. Pat. No. 5,119,397 to Dahlin et al. is incorporated here by reference.

In a TDMA cellular radiotelephone system, each radio channel is divided into a series of time slots, each of which contains a burst of information from a data source, e.g., a digitally encoded portion of a voice conversation. The time slots are grouped into successive TDMA frames having a predetermined duration. The number of time slots in each TDMA frame is related to the number of different users that can simultaneously share the radio channel. If each slot in a TDMA frame is assigned to a different user, the duration of a TDMA frame is the minimum amount of time between successive time slots assigned to the same user. The successive time slots assigned to the same user for voice communication are usually not consecutive time slots on the radio carrier. The assigned slots constitute the user's digital traffic channel, which may be considered a logical channel assigned to the user. In addition to voice or traffic channels, cellular radio communication systems also provide paging/access, or control, channels for carrying call-setup messages between base stations and mobile stations. The European GSM system is an all-digital system, in which 200-KHz-wide radio channels are located near 900 MHz. Each GSM radio channel has a gross data rate of 270 kilobits per second and is divided into eight full-rate traffic channels (each traffic time slot carrying 116 encrypted bits).

Fault detection and fault localization of the radio parts in a radio BS are capabilities that are important for lowering the operation and maintenance (O & M) costs incurred by the operator of a cellular radio network, minimizing cellular traffic down time, and increasing the quality of service for the end users. Conventionally, faults are detected and localized by covering separate units and functions in the radio base station. A problem with this approach is that it is difficult to cover all the possible faults in the transmitter and receiver chains that would cause degradation or would disable cellular traffic transmission.

It is known to provide a particular transceiver tester (TRXT) in a BS that communicates with a number of MSs. A TRXT 10 is depicted in FIG. 1 as part of a transceiver group (TG) 100. The TG 100 includes two transceivers (TRXs), each comprising four components: a transceiver controller (TRXC) 22, an eight-channel signal processing part (8×SPP) 24, a radio transmitter (RTX) 26, and a radio receiver (RRX) 28.

The TRXC 22 controls signalling between the TRX and a base station controller (BSC) (not shown). TG control (TGC) is included as a software function in one TRXC 22 to handle common control functions in the TG 100. TGC uses a control time slot assigned to the TRX for communicating with the BSC through a transceiver radio interface (TRI) 30. The 8×SPP 24 handles all digital signal processing, e.g., equalization and channel coding, for one time slot and can serve up to eight full-rate duplex channels.

The RTX 26 includes functions for modulation, radio-frequency (RF) carrier signal generation, and power amplification. There is at least one RTX per TRX. If no frequency hopping is employed, each RTX belongs to one specific TRX. An example of such a configuration of a TRX is shown by a dotted line in FIG. 1. If frequency hopping is employed, one RTX is provided for each hopping frequency, and the number of RTXs can be larger than the number of TRXs. In the case of frequency hopping, the RTX belongs to different TRXs for each time slot.

Each TRX further includes a receiver (RRX) 28. The RRX 28 is the radio part for receiving and includes functions for reception and demodulation. Each RRX belongs to one specific TRX.

Also included in the TG are a timing module (TM) 40, a transmitter combiner 50, and a receiver divider 60. The TM 40 provides a reference frequency from an incoming pulse code modulation (PCM) clock and takes care of frame synchronization. The combiner 50 combines the signals from a number of RTXs to one antenna. The receiver divider 60 includes a receiver divider amplifier (RXDA) and a receiver divider (RXD) that amplify and distribute the signals from the receiving antennas, RXA ANT and RXB ANT, to the RRXs.

When frequency hopping is employed in the TG 100, a base-band switch (BBX) 70 is provided for each TRX to control the signal path between the TRXC 22 and the RTX 26. The switch connects each signal burst from the TRXC 22 to the current RTX according to the hopping sequence and is mainly implemented by software in the 8×SPP 24 and the RTX.

A TRXT unit 10 is included in the TG of FIG. 1 for performing a functional test of the transmitter and receiver units of the entire base station TG 100 under control from the BSC. The TRXT 10 is connected to the transmitting antenna, TX ANT, and to the receiver divider 60 by a directional coupler and operates in response to test loop (TL) control signals, TX TL, RXA TL, and RXB TL. The TRXT 10 communicates with BSC via the TGC function.

The TRXT 10 performs measurements of the various functions of a TG 100 on a certain channel (frequency and time slot) and then gives the result after a certain delay in a time slot which is separate from the time slot in which measuring is performed. The measurement result is thus given in a channel different than the channel the test was intended for. This creates a problem since the transmitter/receiver conditions can be quite different with regard to-wave propagation and multipath propagation. The measurement will be dependent on the conditions of two channels instead of only one and can therefore be erroneous.

Further details of the components of a BS as described above with regard to FIG. 1 are disclosed in *CME 20 MSC/VLR/HLR O&M Training document*, Ericsson Radio Systems AB (1993) and *CME 20 System Survey Training Document*, Ericsson Radio Systems AB (1991, 1992, 1994), both of which are incorporated here by reference.

Other test units have been proposed to detect faults in a transceiver. International Patent Publications No. WO 91/19365 and No. WO 91/19366 disclose a transceiver test loop in which a test signal is delayed before it is delivered to a receiver. International Patent Publication. No. WO 91/15904 discloses a remote test mobile for base station transceiver equipment in which a delay is introduced into the test mobile. These testing systems suffer from the same problem as the aforementioned TRXT unit, i.e., the delay of the test signal can cause erroneous results.

There is a need for a system that supervises a complete chain of radio equipment that is used to provide cellular traffic from a radio base station in a cellular network. Such a system would fill the gap which is not covered by any other supervision function in a base transceiver station (BTS).

SUMMARY

It is an object of Applicant's invention to provide test and supervision capabilities over a complete chain of radio equipment needed to carry cellular traffic to and from a radio base station.

It is another object of Applicant's invention to improve fault detection and fault localization, thus lowering operating and management costs, minimizing cellular traffic down time and increasing quality of service for the end user.

In one aspect of Applicant's invention, a software-modified mobile station (MS) is cable-connected between transmitter and receiver parts in a radio base station (BS). The base station controller (BSC) establishes connections to a transceiver tester (TRXT) unit contained in the MS on all traffic channels in the cell and evaluates downlink measurement reports from the MS and uplink measurement reports. In this way, continuous supervision in the cell is provided to accomplish fast fault detection and fault localization. If signal strength and/or bit error rate are not within a predefined expected interval, an alarm is given in the BSC. Also, reports can be provided on the measured signal strength and bit error rate on all traffic channels (TCH's) in the cell. The transceiver test can be initiated automatically at predetermined periods or manually by command. In addition, statistics on traffic in the cell are evaluated so that abnormal behavior in the cell results in automatic initiation of a transceiver test.

BRIEF DESCRIPTION OF THE DRAWINGS

Applicant's invention is described below in more detail with reference to preferred embodiments, given only by way of example and illustrated in the accompanying drawings, in which.

DETAILED DESCRIPTION

In a cellular network, a base station system (BSS) is provided to connect a mobile station (MS) to a switching system (SS). The BSS includes several base transceiver stations (BTS) and a base station controller (BSC). A BTS is the radio equipment needed to serve one cell, including the aerial system, power amplifiers, and digital processing equipment. The BSC controls and supervises the BTS's and the radio connections in the BSS.

For each cell there is provided a transceiver group (TG). As described above with regard to FIG. 1, the TG includes several transceivers (TRX), one for each carrier in a cell. A TRX contains most of the equipment needed to transmit/receive on the carrier. The TRX's are all connected to the same transmitter antenna.

According to the present invention, a TRXT unit is provided as a separate hardware unit in a BTS that connects the RTX and the RRX of a TRX. The TRXT unit performs a test to verify transmitter and receiver links in a BTS by establishing TCH connections to the TRXT unit and evaluating signal strength and quality, uplink and downlink, on all idle TCH channels.

A transceiver test can be initiated manually by operator command or automatically at predetermined periods by the BSC. Parameters can be set in the BSC to indicate whether the BSC will automatically initiate tests and the interval between the tests. The tests can be scheduled to occur automatically at any desired time. Typically, these tests will be scheduled to occur at night to lessen the probability of interfering with user traffic.

Decision logic may be included in the BSC to initiate an automatic test based on traffic statistics of successful TCH assignments. This logic would detect if the rate of unsuccessful TCH assignments is too high or if no calls are connected to the cell during a predefined time interval. Thus, continuous supervision of the radio parts in the BTS is provided without disturbing the radio environment.

The TRXT function can be implemented with an Antenna Diversity Supervision function. Some systems, for example the Digital Communication System 1800 (DCS 1800), employ two antennas. In the case of two antennas, illustrated for example as RXA ANT and RXB ANT in FIG. 1, both transmitter links are preferably supervised by the TRXT test. The Antenna Diversity Supervision function provides continuous supervision of both the receiver connections, RXA and RXB, when diversity is in use. Together, the TRXT function and the Antenna Diversity Supervision function provide significantly increased supervision of the receiver part in the BTS and ensure that the transmitting links and receiver links as a whole are supervised and verified.

Figure 1:
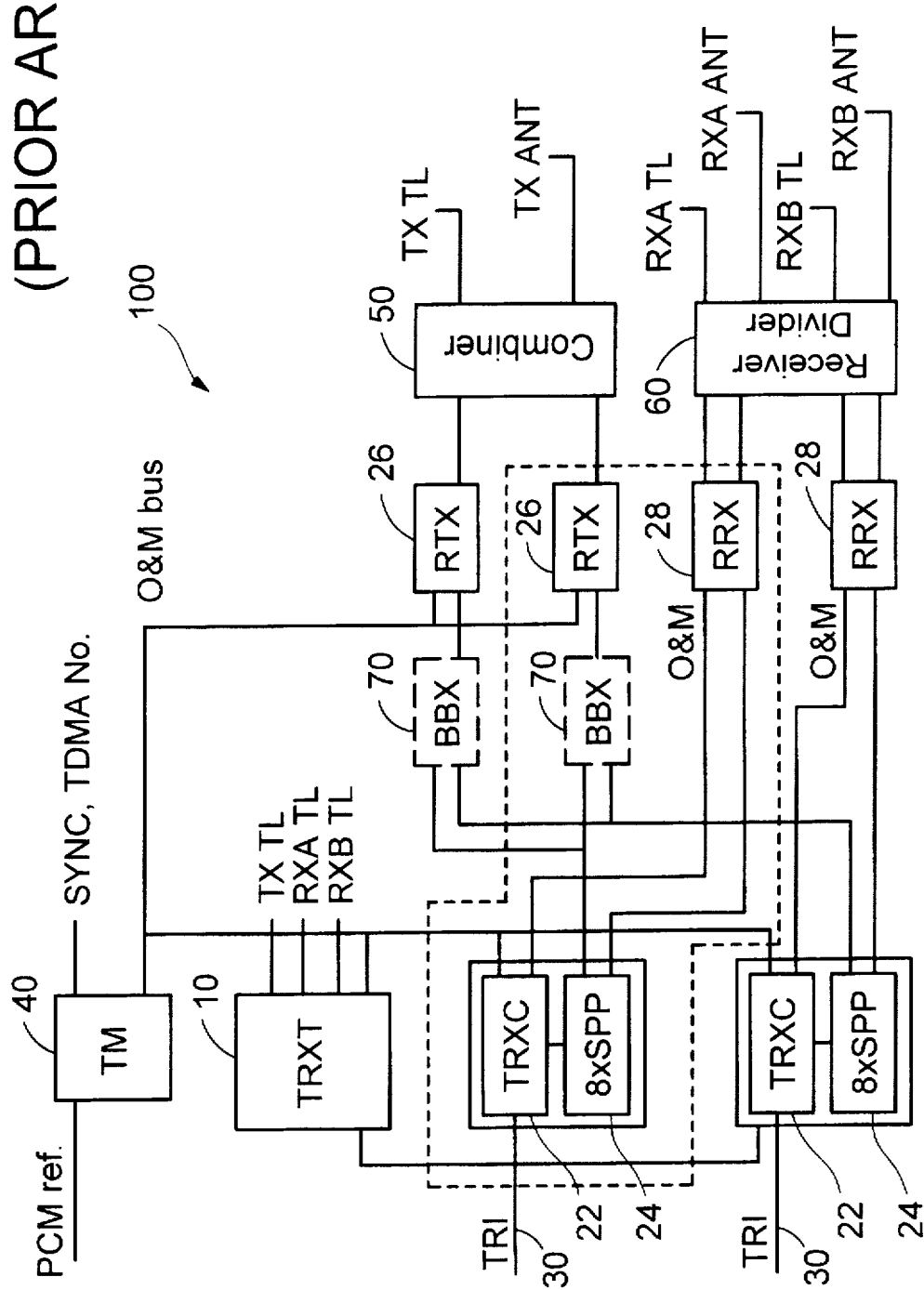
FIG. 1 illustrates a typical block diagram of a transceiver group.
Figure 2:
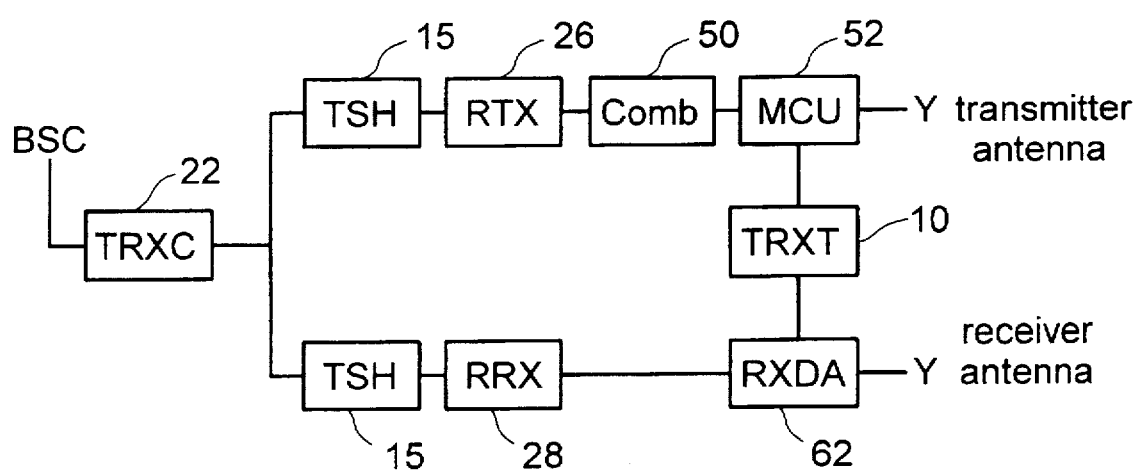
FIG. 2 illustrates a radio frequency test loop according to the present invention.

A test loop is shown as an embodiment of the present invention in FIG. 2, with the same reference numerals given to elements that appear also in FIG. 1. A TRXT test is initiated and controlled from the BSC. On the transmitter end (downlink), channels to be tested are delivered to a time slot handler (TSH) 15. The TSH 15 determines which time slots on which carrier frequencies are to be tested. The test does not disturb normal traffic on time slots not involved in the test. The channels are transmitted via the RTX 26, combined in the combiner 50 and delivered to a measuring coupler unit (MCU) 52. The MCU 52 is essentially a splitter that delivers transmitter link signals to the TRXT unit 10 via a cable connection.

The TRXT unit 10 performs measurements as to signal strength and quality on the transmitter link signals and reports to the BSC via the receiver feedback loop (i.e., via an uplink channel). Signals are sent from the TRXT unit 10 to the RXDA 62 via a cable. The RXDA 62 sends these feedback signals to the RRX 28 where measurements are performed as to signal strength and quality. Then, the RRX sends these signals via TSH 15 to the BSC for evaluation.

Using the test loop shown in FIG. 2, it is possible to establish connections between a TRXT unit and all configured TCH channels in a cell, including all channel groups. When a transceiver test is initiated, a connection is established to the TRXT on all idle traffic channels using standard call establishment signalling. The BSC then evaluates measurement reports on signal strength and quality.

The TRXT unit 10 provides measurements and reports on the transmitting link, and the RRX 28 provides measurements and reports on the receiver link, thus ensuring that both the uplink and downlink paths of the radio channel are verified. The processor in the BSC is suitably programmed for evaluating these measurements and reports. The TRXT test checks that the emitted power is within a predefined interval around the expected nominal value. The downlink quality measurements are used to verify that the bit error rate (BER) on the transmitter link is below an acceptable rate. The TRXT test also checks that the power level measured by the receiver is within a predetermined interval around an expected value. The receiver quality measurements are used to verify that the BER is below an acceptable rate.

The procedure outlined above describes the evaluation of one channel in a cell. Ultimately, all cells within a cell site are tested with a TRXT unit as they become idle.

After testing is completed, a printout of test results may be provided, including information about which channels were tested and which were found faulty. If the test results show that all criteria are met, then all the RRX, RTX's, and time slots plus all interconnections between these units in the test are considered working properly.

A faulty test result indicates faulty BTS equipment. The location of fault is determined as the transmitter or receiver link which corresponds to the TG, TRX and time slot being tested. When a faulty test result occurs, an alarm is provided in the BSC.

The TRXT unit 10 can be located on a board inside the BTS equipment cabinet, as a plug-in unit, easy to install in already delivered equipment. The transceiver test can be initiated at installation or during cell operation by maintenance personnel to verify that all connections in a cell are working.

Power supply to the TRXT unit 10 can be provided by known means from the BTS equipment. Configured BS and MS power during a TRXT test and attenuation used toward and from the TRXT unit are coordinated with the BSC. The TRXT unit preferably restarts automatically after power supply failure.

The TRXT test loop does not disturb normal traffic, but acts only on idle traffic channels. To this end, the TRXT unit preferably conforms with the GSM technical specifications for mobile traffic handling with the following few exceptions. The TRXT unit always responds to a page with the international mobile subscriber identity (IMSI), and the MS terminal used in the TRXT unit is switch-programmed with a unique TRXT IMSI. Also, the TRXT test can be run with no subscriber identity module (SIM) card in the TRXT MS terminal.

As a further exception to the GSM specifications, the location updating and IMSI attach/detach procedures normally found in an MS unit are removed from the MS used in the TRXT unit, in order to avoid registering all TRXT units in the home location register (HLR) and the signalling associated with registering. When removing the attach/detach procedures, care must be taken to ensure that no interferences with other traffic functions cause malfunctioning of the TRXT function.

Yet another exception to the GSM specification is that the discontinuous transmission (DTX) on the uplink is not used by the TRXT unit, in order to optimize accuracy in MS measurements. After all, since the point of the TRXT is to test the components of the BS, it is undesirable to interrupt the TRXT transmission, as would be the case with DTX. Finally, a TRXT test can be run in a TRXT unit in a barred cell.

All uplink and downlink time slots configured as TCH can be tested with the TRXT unit. Uplink and downlink time slots configured as broadcast control channels (BCCH) and stand alone dedicated control channels (SDCCH) are implicitly supervised and verified by means of a successful TRXT test. The TRXT unit can perform tests in both non-hopping and frequency hopping cells, including baseband and synthesized hopping.

The TRXT unit measures and reports signal strength and quality of the downlink signal in the TRXT loop, with an accuracy according to the GSM 05.08 specification. When a test loop is established, the TRXT unit 10 feeds the RXDA 62 with a signal with a tolerance of the transmitted signal strength according to the GSM 05.05 specification. Fault indications are provided according to the GSM 12.11 specification. These GSM specifications are incorporated here by reference.

It will be understood that the MS-based TRXT unit according to the present invention acts as a mobile with calls being made to it. BTS equipment is supervised based on signal strength and quality of real TCH connections. The MS based TRXT unit provides a more direct verification of the ability of the BTS equipment to connect and serve mobiles in the cell than a TRXT unit which evaluates a test pattern and loop defined for TRXT only.

The MS-based TRXT unit according to the present invention occupies only one TCH at a time when running a test, instead of two, as occupied by the conventional test loops. Hence, the availability in the cell for normal traffic during a test is improved by the MS based TRXT unit.

A continuous supervision of BTS hardware equipment without disturbing the radio environment is provided with the MS based TRXT according to the present invention, via decision logic based on successful TCH assignments for initiation of a TRXT test. The TRXT test is performed independently of BTS hardware and software. The TRXT test unit can detect any fault in the transmitter or receiver chains that results in variations of signal strength or signal quality outside a set interval and can detect and pinpoint all TCH channels and associated BTS equipment not able to connect and serve mobiles.

While an embodiment of Applicant's invention has been illustrated above. Applicant's invention is not limited to this particular embodiment. This application contemplates any and all modifications that fall within the spirit and scope of Applicant's invention as defined by the following claims.

What is claimed is:

1. A method of supervising and testing radio equipment in a radio base station used to carry cellular traffic comprising the steps of:

establishing traffic connections between a transceiver test unit in a mobile station and a base transceiver station on all traffic channels in a cell; and evaluating signal strength and bit error rates on all idle traffic channels, wherein if signal strength and bit error rates are outside a predetermined interval, the radio equipment is determined to be faulty and an alarm is given in the base station.

2. The method of claim 1, wherein discontinuous transmission to the transceiver test unit is disabled.

3. A method of supervising and testing radio equipment in a radio base station used to carry cellular traffic, comprising the steps of:

establishing traffic connections between a transceiver test unit in a mobile station and a base transceiver station on all traffic channels in a cell; and evaluating traffic statistics in a cell, wherein if traffic statistics are evaluated as abnormal, a transceiver test is automatically initiated and signal strength and bit error rates are evaluated on all idle traffic channels, and if the signal strength and bit error rates are outside a predetermined interval, the radio equipment is determined to be faulty and an alarm is given in the base station.

4. A system for supervising and testing radio equipment in a radio base station used to carry cellular traffic, comprising:

means for establishing traffic connections between a transceiver test unit in a mobile station and a base transceiver station on all traffic channels in a cell; and means for evaluating signal strength and bit error rates on all idle traffic channels, determining that the radio equipment is faulty if the signal strength and bit error rates are outside a predetermined interval, and giving an alarm in the base station if the radio equipment is determined to be faulty.

5. The system of claim 4, main wherein discontinuous transmission to the transceiver test unit is disabled.

6. A system for evaluating statistics on traffic in a cell in a cellular network, comprising:

means for establishing traffic connections between a transceiver test unit in a mobile station and a base transceiver station on all traffic channels in the cell;

means for evaluating traffic statistics in the cell, which automatically initiates a transceiver test if traffic statistics in the cell are evaluated as abnormal; and means for evaluating signal strength and bit error rates on all idle traffic channels in response to initiation of a transceiver test, determining that equipment in the cell is faulty if the signal strength and bit error rates are outside a predetermined interval, and giving an alarm in the cell if the radio equipment is determined to be faulty.

* * * * *